US010924903B2

(12) United States Patent
Lou et al.

(10) Patent No.: US 10,924,903 B2
(45) Date of Patent: *Feb. 16, 2021

(54) SOFTWARE DEFINED IOT SERVICE NETWORK ARCHITECTURE

(71) Applicant: AT&T Intellectual Property I, L.P., Atlanta, GA (US)

(72) Inventors: Yuang Lou, Dunwoody, GA (US); Douglas A. Duet, Roswell, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/528,226

(22) Filed: Jul. 31, 2019

(65) Prior Publication Data

US 2019/0357028 A1 Nov. 21, 2019

Related U.S. Application Data

(63) Continuation of application No. 15/231,008, filed on Aug. 8, 2016, now Pat. No. 10,412,562.

(51) Int. Cl.
*H04W 72/04* (2009.01)
*H04W 4/70* (2018.01)
*H04L 29/08* (2006.01)
*H04W 84/12* (2009.01)

(52) U.S. Cl.
CPC ............ *H04W 4/70* (2018.02); *H04L 67/12* (2013.01); *H04W 84/12* (2013.01)

(58) Field of Classification Search
None
See application file for complete search history.

(56) References Cited

U.S. PATENT DOCUMENTS

| 8,671,099 B2 | 3/2014 | Kapoor et al. |
| 8,942,191 B2 | 1/2015 | Kushwaha et al. |
| 9,021,139 B1 | 4/2015 | Pathuri et al. |
| 9,166,908 B2 | 10/2015 | Vasseur |

(Continued)

FOREIGN PATENT DOCUMENTS

| KR | 101566957 | 11/2015 |
| KR | 101584176 | 1/2016 |

(Continued)

OTHER PUBLICATIONS

Bernardos, Carlos et al., "An architecture for software defined wireless networking", Wireless Communications, IEEE 21.3, 2014, 52-61.

(Continued)

*Primary Examiner* — Willie J Daniel, Jr.
(74) *Attorney, Agent, or Firm* — Guntin & Gust, PLC; Ralph Trementozzi

(57) ABSTRACT

Aspects of the subject disclosure may include, for example, a method including aggregating data received from machine-to-machine (M2M) devices to generate local information. The method can also include receiving a message, from a user communication device, that includes a request regarding an M2M communication device. If the request cannot be responded to based on the local information, a query is transmitted to the M2M communication device based on the analyzing. Other embodiments are disclosed.

20 Claims, 9 Drawing Sheets

(56) References Cited

U.S. PATENT DOCUMENTS

| | | |
|---|---|---|
| 9,292,832 B2 | 3/2016 | Goel et al. |
| 10,412,562 B2 * | 9/2019 | Lou .................... H04L 67/12 |
| 2010/0029211 A1 | 2/2010 | Teague et al. |
| 2014/0108943 A1 | 4/2014 | Lee et al. |
| 2014/0244710 A1 | 8/2014 | Sharma et al. |
| 2014/0244768 A1 | 8/2014 | Shuman et al. |
| 2014/0244825 A1 | 8/2014 | Cao et al. |
| 2014/0328190 A1 | 11/2014 | Lord et al. |
| 2015/0006719 A1 | 1/2015 | Gupta et al. |
| 2015/0095478 A1 | 4/2015 | Zuerner |
| 2015/0249672 A1 | 9/2015 | Burns et al. |
| 2015/0288622 A1 | 10/2015 | Fargano et al. |
| 2016/0014787 A1 | 1/2016 | Zhang et al. |
| 2016/0085594 A1 | 3/2016 | Wang et al. |
| 2016/0087854 A1 | 3/2016 | Jayanti Venkata et al. |
| 2016/0156513 A1 | 6/2016 | Zhang et al. |
| 2016/0164728 A1 | 6/2016 | Chakrabarti et al. |
| 2017/0111227 A1 | 4/2017 | Papageorgiou et al. |
| 2018/0034715 A1 | 2/2018 | Nagaraju et al. |
| 2018/0041856 A1 | 2/2018 | Lou et al. |

FOREIGN PATENT DOCUMENTS

| | | |
|---|---|---|
| WO | 2011082150 A1 | 7/2011 |
| WO | 2011112683 A1 | 9/2011 |
| WO | 2013123445 A1 | 8/2013 |
| WO | 2015046695 A1 | 4/2015 |
| WO | 2015176775 | 11/2015 |
| WO | 2016060370 | 4/2016 |

OTHER PUBLICATIONS

Botta, Alessio et al., "Integration of cloud computing and internet of things: a survey", Future Generation Computer Systems 56, 2016, 684-700.

Caraguay, Valdivieso et al., "SDN: evolution and opportunities in the development IoT applications", International Journal of Distributed Sensor Networks, 2014.

Lantz, Bob et al., "A network in a laptop: rapid prototyping for software-defined networks", Proceedings of the 9th ACM SIGCOMM Workshop on Hot Topics in Networks, 2010.

Nastic, Stefan et al., "Provisioning software-defined iot cloud systems", Future Internet of Things and Cloud (FiCloud), 2014.

* cited by examiner

100

200

300

400

SOFTWARE DEFINED IOT SERVICE NETWORK ARCHITECTURE

CROSS REFERENCE TO RELATED APPLICATIONS

This application is a continuation of U.S. patent application Ser. No. 15/231,008 filed Aug. 8, 2016. The contents of the foregoing are hereby incorporated by reference into this application as if set forth herein in full.

FIELD OF THE DISCLOSURE

The subject disclosure relates to combined wireless/wireline communication networks, and more particularly to a software-defined architecture for communicating with distributed devices in the Internet of Things (IoT).

BACKGROUND

A very wide variety of devices with differing device capabilities may connect to a communication network at various times and for various purposes (for example, a sensor periodically transmitting small amounts of data to a computing device). A network that includes such devices is sometimes referred to as the Internet of Things (IoT). IoT devices are used in both residential and commercial settings. Residential IoT devices can include smart appliances, smart thermostats, personal/medical monitors, alarm systems, etc. IoT devices are typically small in size, with limited battery power and communication range.

BRIEF DESCRIPTION OF THE DRAWINGS

Reference will now be made to the accompanying drawings, which are not necessarily drawn to scale, and wherein.

DETAILED DESCRIPTION

Figure 1:
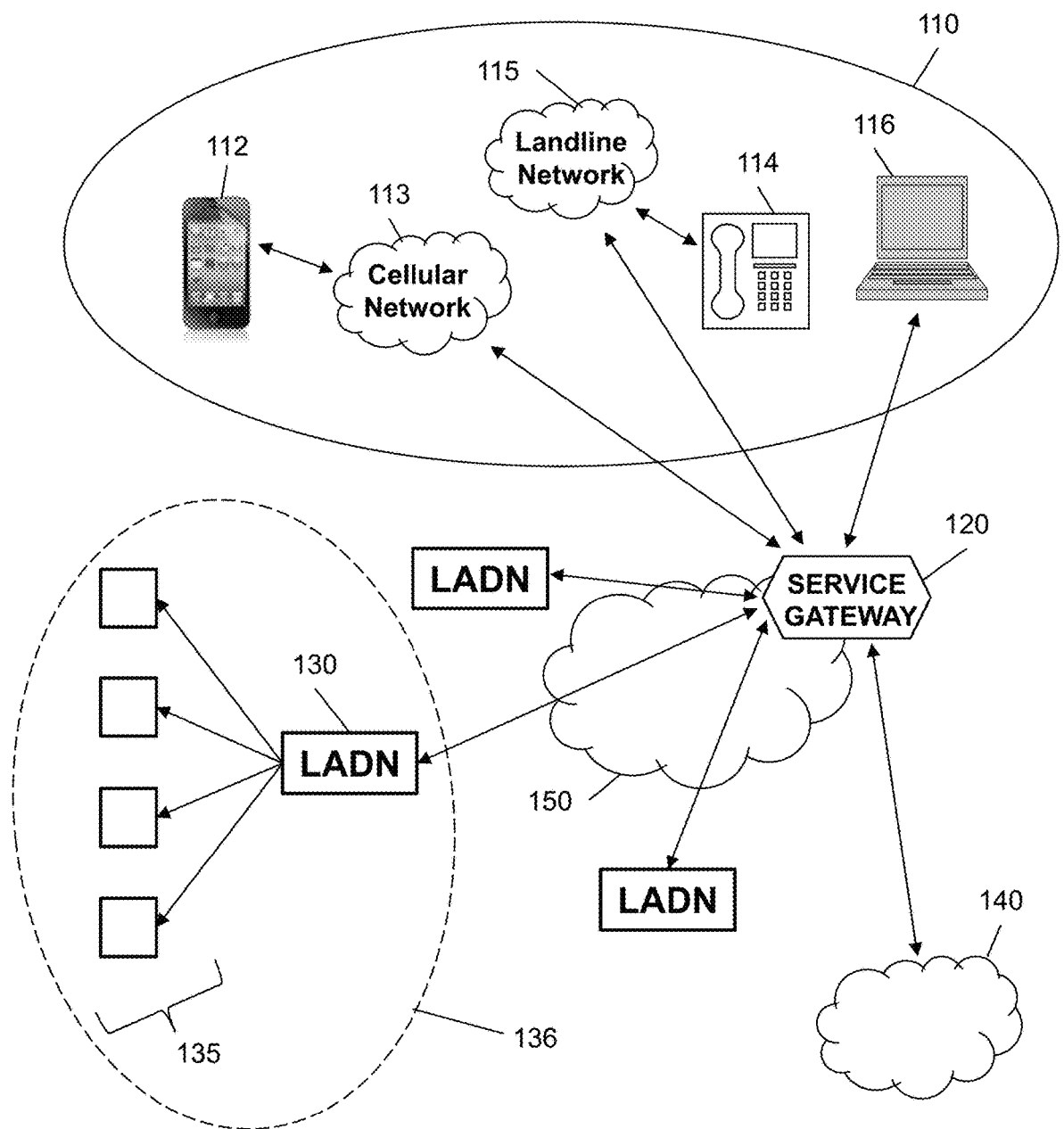
FIG. 1 depicts an illustrative embodiment of an IoT service network, in accordance with the disclosure.

The subject disclosure describes, among other things, illustrative embodiments for an IoT service network architecture in which a local aggregator device node (LADN) is in short-range communication with IoT devices (using, for example, wireless microwave or millimeter-wave communications), and where the device node is pre-programmable and remotely manageable by the user. Other embodiments are described in the subject disclosure.

One or more aspects of the subject disclosure include a device (e.g., a LADN) comprising a processing system including a processor, and a memory that stores executable instructions that, when executed by the processing system, facilitate performance of operations. The operations comprise receiving data from a plurality of machine-to-machine (M2M) communication devices located in a premises, and aggregating the data to generate local monitored information. The operations also comprise receiving a message from a user communication device, where the message comprises a request regarding an M2M communication device of the plurality of M2M communication devices. The operations further comprise analyzing the request according to the local monitored information and, in accordance with determining that the request cannot be responded to based on the local monitored information, transmitting a query message to the M2M communication device based on the analyzing and receiving a reply to the query message from the M2M communication device. The operations also comprise generating a response message based on the reply. The device receives the data and transmits the query message using millimeter-wave communications, WiFi communications, or a combination thereof.

One or more aspects of the subject disclosure include a method comprising receiving, by a processing system including a processor, data from a plurality of machine-to-machine (M2M) communication devices located in a premises. The method also comprises aggregating the data to generate local monitored information, and receiving a message from a user communication device; the message comprises a request regarding an M2M communication device of the plurality of M2M communication devices. The method also comprises analyzing the request according to the local monitored information. In accordance with determining that the request cannot be responded to based on the local monitored information, the method further comprises transmitting a query message to the M2M communication device based on the analyzing and receiving a reply to the query message from the M2M communication device. The method also comprises generating a response message based on the reply; the device receives the data and transmits the query message within the premises using millimeter-wave communications with the M2M communication device, WiFi communications, or a combination thereof.

One or more aspects of the subject disclosure include a machine-readable storage medium, comprising executable instructions that, when executed by a processing system including a processor, facilitate performance of operations. The operations comprise receiving data from a plurality of machine-to-machine (M2M) communication devices located in a premises, aggregating the data to generate local monitored information, and storing the local monitored information. The operations also comprise receiving a message from a user communication device; the message comprises a request regarding an M2M communication device of the plurality of M2M communication devices. The operations further comprise analyzing the request according to the local monitored information and, in accordance with determining that the request cannot be responded to based on the local monitored information, transmitting a query message to the M2M communication device based on the analyzing and receiving a reply to the query message from the M2M communication device. The operations also comprise generating a response message based on the reply; the device receives the data and transmits the query message within the premises using millimeter-wave (mmW) communications, WiFi communications, or a combination thereof.

FIG. 1 schematically illustrates a software-defined IoT service network 100, in accordance with an embodiment of the disclosure. In this embodiment, the IoT service network has four components: user access 110, service gateway 120, local aggregator device node (LADN) 130, and the data storage cloud 140. The LADN and the service gateway communicate via the Internet 150. In an embodiment, FIG. 1 illustrates a network architecture in which a service layer on top of a physical internet protocol (IP) network provides access to a number of IoT devices using local wireless coverage. The IoT devices are also referred to herein as machine-to-machine (M2M) communication devices.

As shown in FIG. 1, LADN 130 communicates with multiple IoT devices 135 located within the LADN coverage area 136. In this embodiment, service network 100 enables user communications with the IoT devices, via IP and/or phone, from any location with available access facility and at any time.

In an embodiment, network 100 is a software-defined network (SDN) in which the user owns, installs and operates the IoT devices. In particular, the user can configure and update the service capabilities of the IoT devices.

Figure 2:
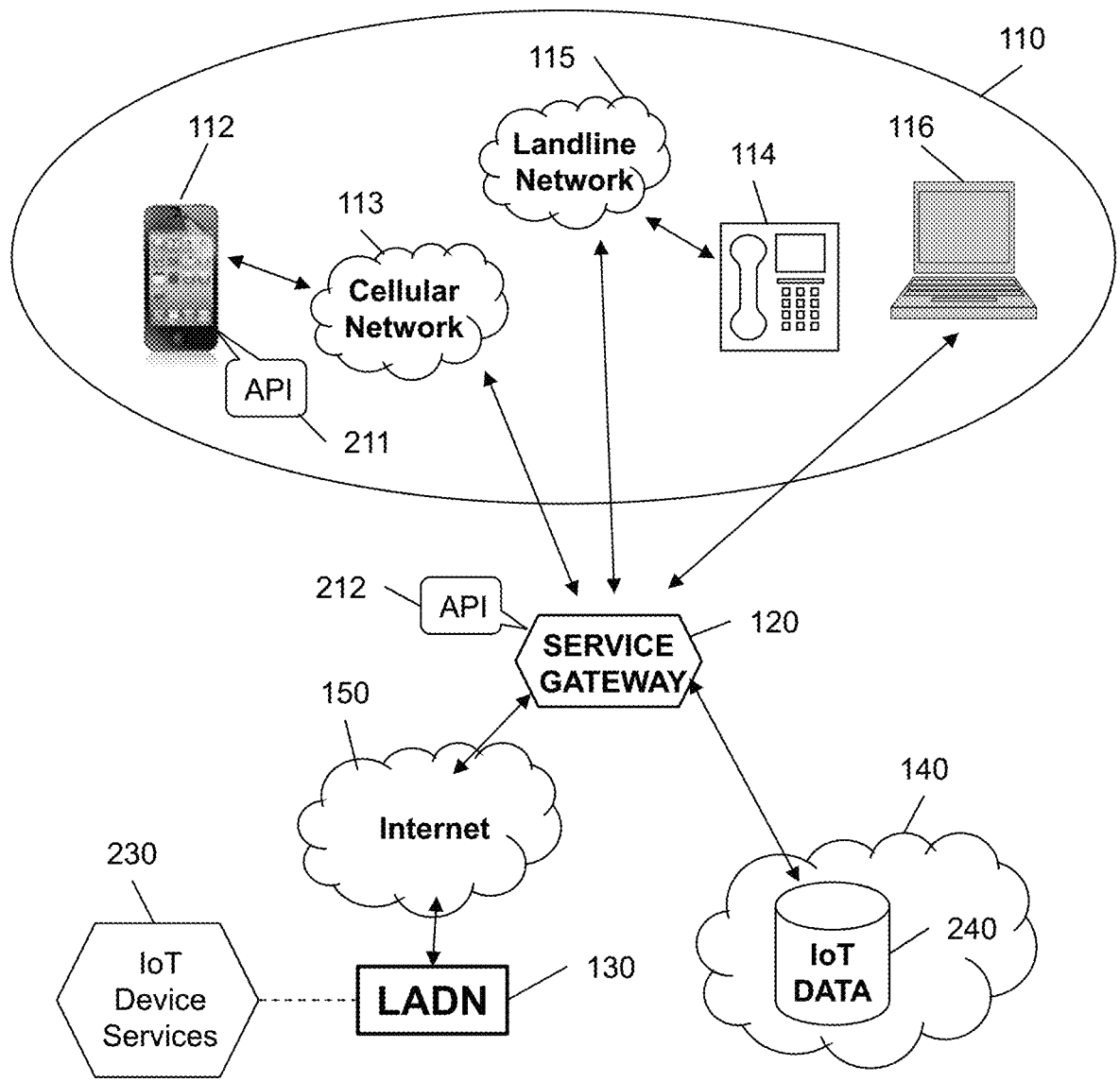
FIG. 2 schematically illustrates details of a user access function of the IoT service network of FIG. 1.

FIG. 2 schematically illustrates an embodiment 200 of the service network, showing features of the user access component 110. In this embodiment, users of the network have access to their local IoT devices through cellular network 113 via a mobile phone 112, through landline network 115 via a landline phone 114, or via an IP connection from a computing device 116. Users can also have access to IoT data 240 stored in the cloud.

In this embodiment, connections to the LADN through a wireless network and mobile phone are enabled using an application program interface (API) 211, 212 on the phone 112 and the service gateway 120. The API provides a login procedure for the IoT services. In this embodiment, the API calls a pre-configured phone number corresponding to the LADN and logs into the service gateway, which validates the user's name and password. The user can then activate and/or direct IoT device services 230 that are pre-programmed in the LADN, according to a configuration of the LADN specified by the user.

In another embodiment, the API is voice-activated; the API transmits the pre-configured number without it being input by the user. In a further embodiment, a user, after completing the login procedure, can program the LADN through the service gateway.

Figure 3:
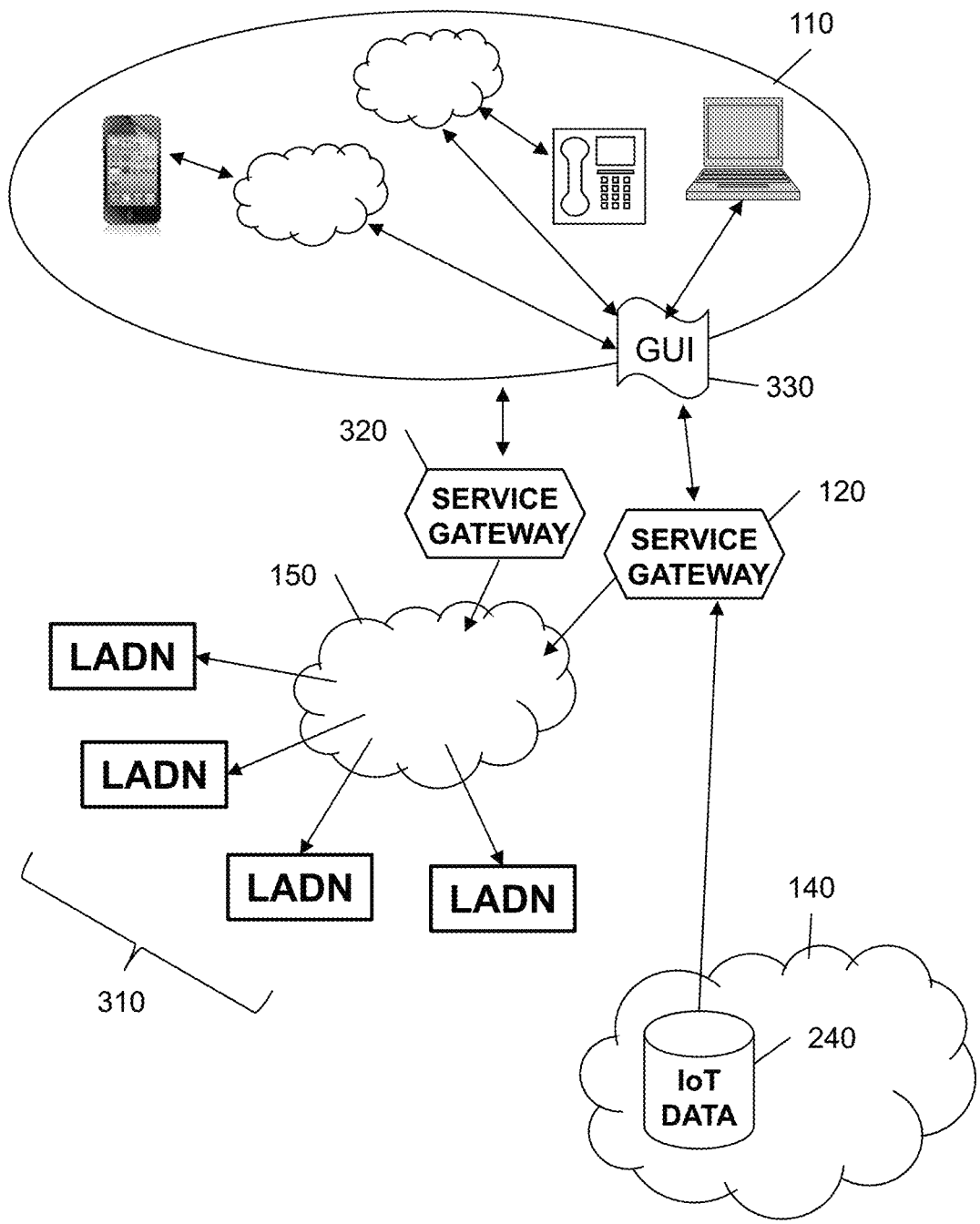
FIG. 3 schematically illustrates details of a service gateway in the IoT service network of FIG. 1.

FIG. 3 schematically illustrates an embodiment 300 of the service network, showing features of the service gateway component 120. The service gateway provides an interface between all the user access devices and the LADN. In this embodiment, service gateway 120 is connected, via the Internet 150, to a group 310 of distributed LADNs in the coverage area of the gateway. Service gateway 120 provides secure user access to the IoT service network, and specifically to the LADN owned and operated by the user. User communications to and from the IoT devices (via the LADN) are routed through the service gateway. In an embodiment, the LADN has an IP address, and user transmissions to the LADN are performed in accordance with a mapping of the IP address to a telephone number that can be displayed to the user at a graphical user interface (GUI) of a communication device of the user.

In an embodiment, the user can activate, direct and/or update IoT service programs via gateway 120, using graphical user interface (GUI) 330. In particular, users can develop and update their own service programs and GUIs for controlling their LADN and local IoT devices. In another embodiment, gateway 120 can accept user voice commands to control the IoT devices.

In an embodiment, multiple service gateways can be associated with a LADN (e.g., a primary gateway 120 and a secondary gateway 320 in FIG. 3) and have IP connections to the LADN, so that communications from the user to the LADN are not interrupted if the primary gateway is taken out of service.

Figure 4:
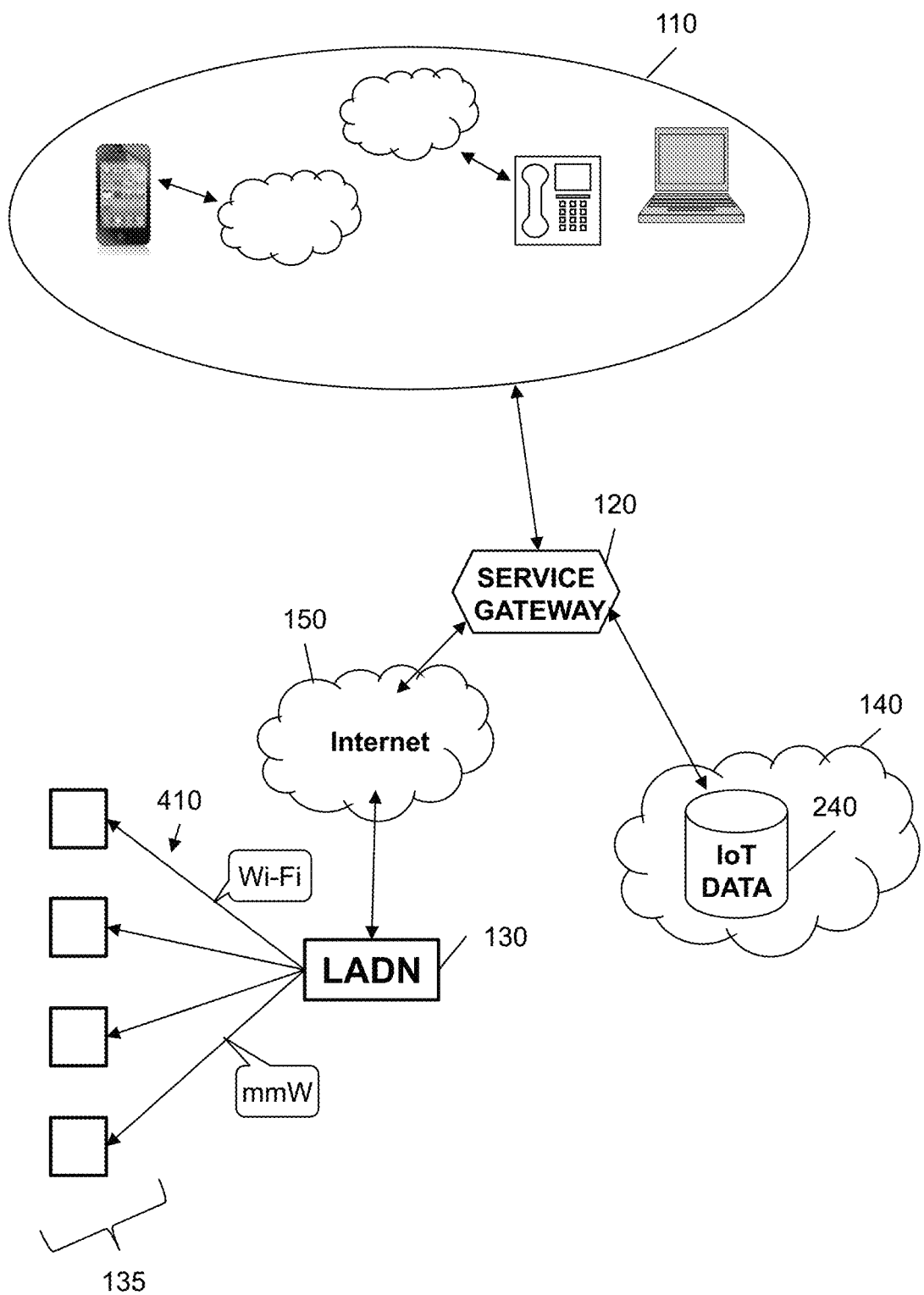
FIG. 4 schematically illustrates details of a local aggregator device node in the IoT service network of FIG. 1.

FIG. 4 schematically illustrates an embodiment 400 of the service network, showing features of the local aggregator device node 130. In this embodiment, the LADN 130 communicates with the service gateway 120 using an IP connection via the Internet 150. The LADN also connects with the local IoT devices 135; in this embodiment, the LADN and IoT devices communicate via millimeter wave (mmW) and/or Wi-Fi wireless links 410. The LADN is accessible and configurable by the user both locally and remotely.

The LADN aggregates all communications from the local devices 135 for transport to the service gateway 120. In an embodiment, the LADN executes user service programming to collect IoT data from devices 135 automatically, following a user-defined schedule. In a further embodiment, the LADN can send the aggregated data to a designated file 240 of IoT data in the cloud 140.

In this embodiment, the LADN and IoT devices are user-owned, and the wireless links 410 are under the user's management. In the case of mmW communications between the IoT devices 135 and the LADN, the communications are short-range (up to 200 m) and under line-of-sight (LoS) or near-LoS conditions. If higher throughput of IoT data and/or a longer range is desired, the wireless links can be in a different frequency range. In a particular embodiment, the wireless links use a channel in the frequency range 2.4 GHz-75 GHz.

Figure 5:
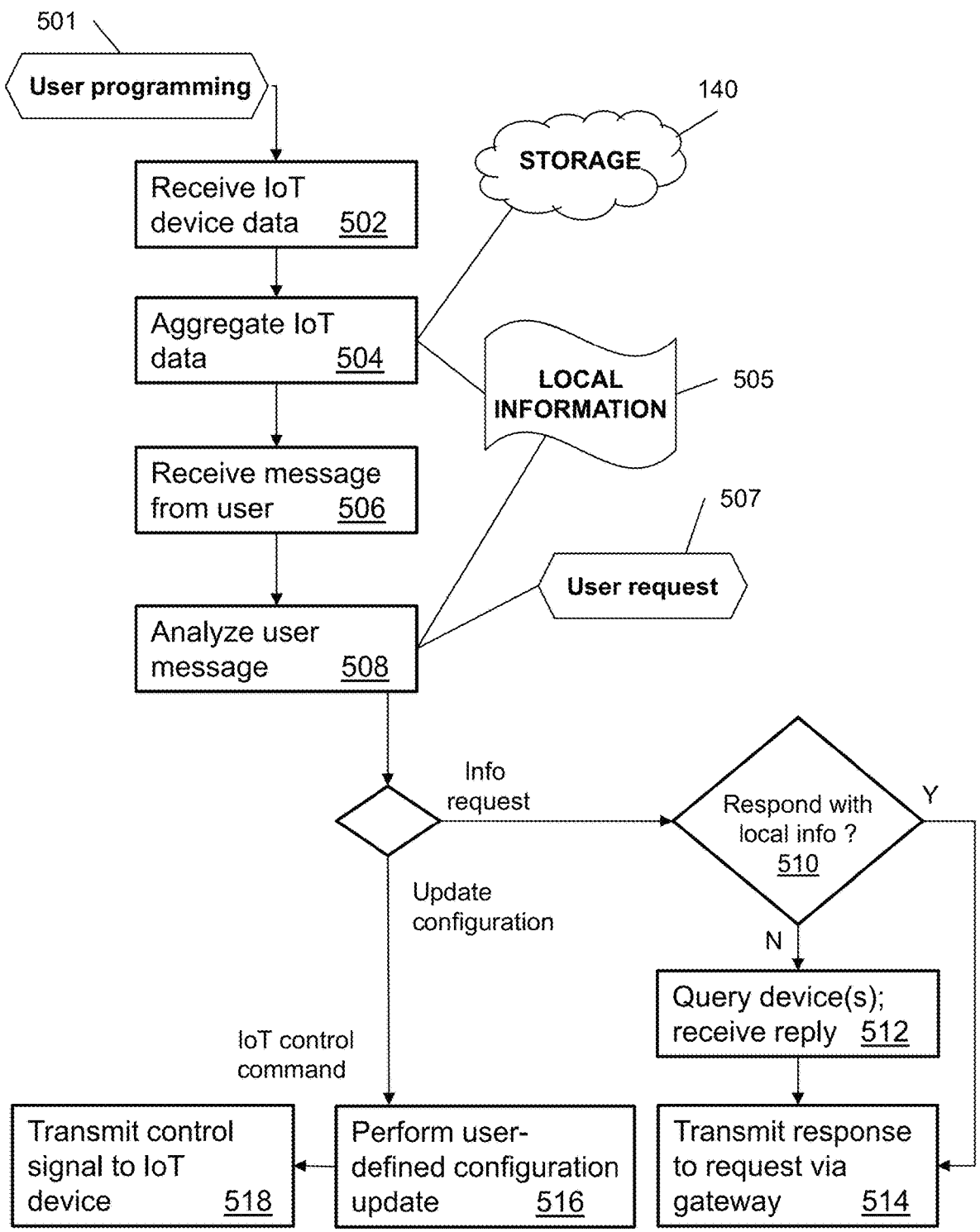
FIG. 5 depicts an illustrative embodiment of a method used in portions of the system described in FIGS. 1-4.

FIG. 5 is a flowchart depicting an illustrative embodiment of a method 500 used in portions of the system described in FIGS. 1-4. The LADN is programmed by the user to collect, aggregate and transmit the IoT device data. Following the user service programming 501, the LADN receives the IoT data (step 502); in an embodiment, the LADN collects data from the devices 135 according to a pre-determined schedule. The LADN aggregates the IoT data (step 504) to generate local information 505. In an embodiment, the local information is stored at the LADN. The IoT data can also be transmitted to the cloud 140 for data storage.

In step 506, the LADN receives a message from user equipment 110 via the service gateway; this message can be delivered to the gateway by various means including, for example, user input to a GUI (e.g., GUI 330), a voice message using the phone number assigned to the LADN, a text message directed to a specific device 135, etc. The LADN then analyzes the user message (step 508); in an embodiment, this analysis is performed according to user-defined rules pre-programmed in the LADN. The LADN can determine that the user message includes a request 507, which may be a query to be directed to an IoT device; an instruction to update the configuration of the LADN and/or one or more of the IoT devices; or a control command directed to one or more of the IoT devices.

In a case where the user is requesting information (for example, the status of an appliance monitored by an IoT device), the LADN determines (step 510) whether it can respond to the request based on the local information. If so, the LADN accesses the local information, generates a response, and transmits the response to the gateway 120 (step 514). Otherwise, the LADN sends a query to one or more IoT devices to obtain the requested information (step 512), and then transmits a response to the gateway (step 514).

In response to the user request 507, the LADN can also perform a user-defined update of the configuration of the LADN and/or the configuration of one or more IoT devices (step 516). The LADN can also transmit a control signal to one or more specified IoT devices (step 518).

While for purposes of simplicity of explanation, the respective processes are shown and described as a series of blocks in FIG. 5, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In accordance with embodiments of the disclosure, a user can manage one or more distributed LADNs with software-defined capabilities that enable an LADN to respond to a user command, and where the user can access IoT devices via a dedicated API on the LADN.

Figure 6:
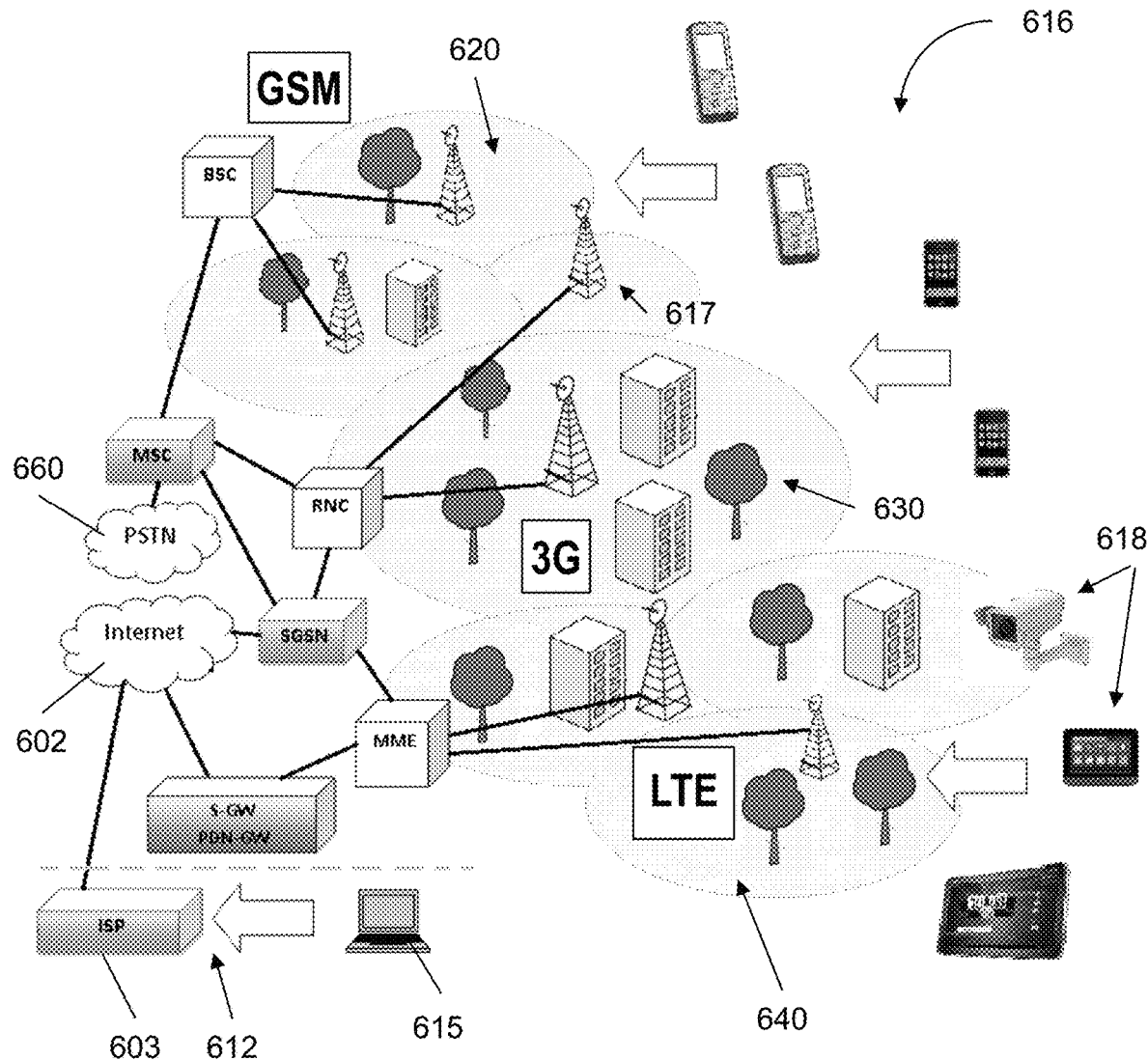
FIGS. 6-7 depict illustrative embodiments of systems that provide communications services to LTE and IoT devices.

FIG. 6 depicts an illustrative embodiment of an architecture 600 for a network for interacting with mobile communication devices and/or IoT devices. According to an embodiment of the disclosure, one or more mobile devices 616 and IoT devices 618 can connect with one or more of the networks shown in FIG. 6. Mobile devices 616 may represent a variety of technologies (phones, tablets, etc.) and may have an end-to-end connection established with either the Public Switched Telephone Network (PSTN) 660, in the case of voice traffic, or an internet protocol network (Internet) 602, in the case of data traffic. The architecture can include a GSM network 620 (Groupe Special Mobile in French, Global Systems for Mobile Communications in English). The architecture also can include a 3G network 630 and/or a Long Term Evolution (LTE) network 640. In particular, LTE specifications define an all-internet protocol architecture with voice over internet protocol (VoIP).

FIG. 6 also illustrates a device 615 accessing the network through a broadband connection 612 to an Internet Service Provider (ISP) 603. Any of devices 615-616, coupled to a computing device (e.g., a server) of the ISP, can comprise a processing system including a processor, and a memory that stores executable instructions that, when executed by the processing system, facilitate performance of operations. The operations can include receiving data from a plurality of machine-to-machine (M2M) communication devices located in a premises, and aggregating the data to generate local monitored information. The operations can also include receiving a message from a user communication device, where the message includes a request regarding an M2M communication device of the plurality of M2M communication devices. The operations can further include analyzing the request according to the local monitored information and, in accordance with determining that the request cannot be responded to based on the local monitored information, transmitting a query message to the M2M communication device based on the analyzing and receiving a reply to the query message from the M2M communication device. The operations can also include generating a response message based on the reply. The device can receive the data and transmits the query message within the premises using millimeter-wave communications, WiFi communications, or a combination thereof.

Figure 7:
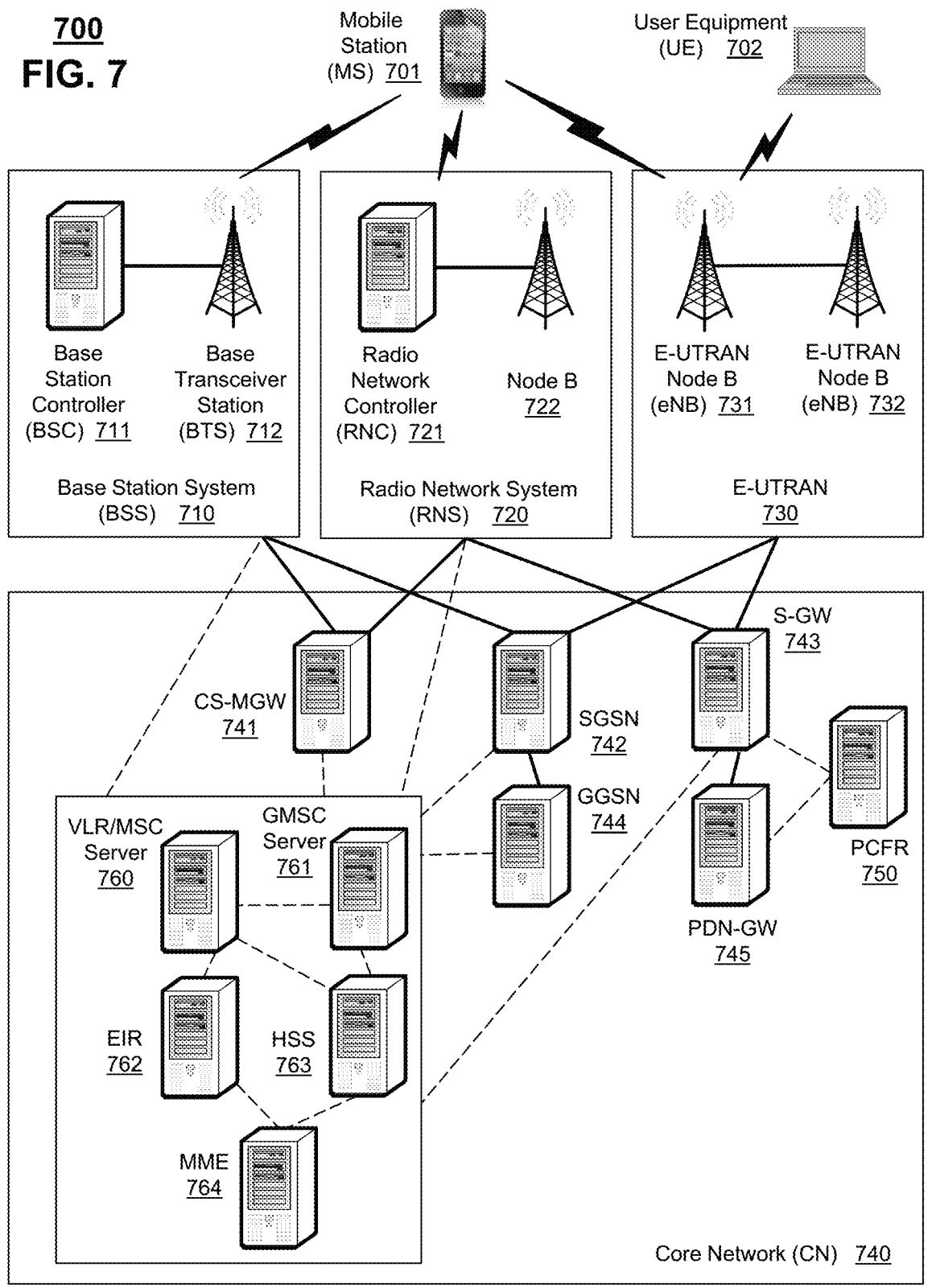

FIG. 7 schematically illustrates a communication system 700 in which one or more embodiments of the subject disclosure may be implemented. Mobile Station 701 may be one of, but not limited to, a cellular telephone, a cellular telephone in combination with another electronic device or any other wireless mobile communication device. According to an embodiment of the disclosure, Mobile Station 701 and/or User Equipment 702 can communicate with one or more of the systems shown in FIG. 7 using carrier aggregation.

Mobile Station 701 may communicate wirelessly with Base Station System (BSS) 710. BSS 710 contains a Base Station Controller (BSC) 711 and a Base Transceiver Station (BTS) 712. BSS 710 may include a single BSC 711/BTS 712 pair (Base Station) or a system of BSC/BTS pairs which are part of a larger network. BSS 710 is responsible for communicating with Mobile Station 701 and may support one or more cells. BSS 710 is responsible for handling cellular traffic and signaling between Mobile Station 701 and Core Network 740. BSS 710 can perform functions that include, but are not limited to, digital conversion of speech channels, allocation of channels to mobile devices, paging, and transmission/reception of cellular signals.

Additionally, Mobile Station 701 may communicate wirelessly with Radio Network System (RNS) 720. RNS 720 contains a Radio Network Controller (RNC) 721 and one or more Node(s) B 722. RNS 720 may support one or more cells. RNS 720 may also include one or more RNC 721/Node B 722 pairs or alternatively a single RNC 721 may manage multiple Nodes B 722. RNS 720 is responsible for communicating with Mobile Station 701 in its geographically defined area. RNC 721 is responsible for controlling the Node(s) B 722 that are connected to it and is a control element in a UMTS radio access network. RNC 721 can perform functions such as, but not limited to, load control, packet scheduling, handover control, security functions, as well as controlling access by Mobile Station 701 access to the Core Network (CN).

The evolved UMTS Terrestrial Radio Access Network (E-UTRAN) 730 is a radio access network that provides wireless data communications for Mobile Station 701 and User Equipment 702. E-UTRAN 730 provides higher data rates than traditional UMTS. It is part of the Long Term Evolution (LTE) upgrade for mobile networks; later releases meet the requirements of the International Mobile Telecommunications (IMT) Advanced and are commonly known as a 4G networks. E-UTRAN 730 may include a series of logical network components such as E-UTRAN Node B (eNB) 731 and E-UTRAN Node B (eNB) 732. E-UTRAN 730 may contain one or more eNBs. User Equipment 702 may be any user device capable of connecting to E-UTRAN 730 including, but not limited to, a personal computer, laptop, mobile device, wireless router, or other device capable of wireless connectivity to E-UTRAN 730. The improved performance of the E-UTRAN 730 relative to a typical UMTS network allows for increased bandwidth, spectral efficiency, and functionality including, but not limited to, voice, high-speed applications, large data transfer and IPTV, while still allowing for full mobility.

An exemplary embodiment of a mobile data and communication service that may be implemented in the PLMN architecture described in FIG. 7 is the Enhanced Data rates for GSM Evolution (EDGE). EDGE is an enhancement for GPRS networks that implements an improved signal modulation scheme known as 9-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Mobile Station 701 may communicate with any or all of BSS 710, RNS 720, or E-UTRAN 730. In an illustrative system, each of BSS 710, RNS 720, and E-UTRAN 730 may provide Mobile Station 701 with access to Core Network 740. The Core Network 740 may include of a series of devices that route data and communications between end users. Core Network 740 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched—Media Gateway Function (CS-MGW) 741 is part of Core Network 740, and interacts with Visitor Location Register (VLR) and Mobile-Services Switching Center (MSC) Server 760 and Gateway MSC Server 761 in order to facilitate Core Network 740 resource control in the CS domain. Functions of CS-MGW 741 include, but are not limited to, media conversion, bearer control, payload processing and other mobile network processing such as handover or anchoring. CS-MGW 741 may receive connections to Mobile Station 701 through BSS 710, RNS 720 or both.

Serving GPRS Support Node (SGSN) 742 stores subscriber data regarding Mobile Station 701 in order to facilitate network functionality. SGSN 742 may store subscription information such as, but not limited to, the International Mobile Subscriber Identity (IMSI), temporary identities, or Packet Data Protocol (PDP) addresses. SGSN 742 may also store location information such as, but not limited to, the Gateway GPRS Support Node (GGSN) 744 address for each GGSN where an active PDP exists. GGSN 744 may implement a location register function to store subscriber data it receives from SGSN 742 such as subscription or location information.

Serving Gateway (S-GW) 743 is an interface which provides connectivity between E-UTRAN 730 and Core Network 740. Functions of S-GW 743 include, but are not limited to, packet routing, packet forwarding, transport level packet processing, event reporting to Policy and Charging Rules Function (PCRF) 750, and mobility anchoring for inter-network mobility. PCRF 750 uses information gathered from S-GW 743, as well as other sources, to make applicable policy and charging decisions related to data flows, network resources and other network administration functions. Packet Data Network Gateway (PDN-GW) 745 may provide user-to-services connectivity functionality including, but not limited to, network-wide mobility anchoring, bearer session anchoring and control, and IP address allocation for PS domain connections.

Home Subscriber Server (HSS) 763 is a database for user information; HSS 763 can store subscription data regarding Mobile Station 701 or User Equipment 702 for handling calls or data sessions. Networks may contain one HSS 763, or more if additional resources are required. Exemplary data stored by HSS 763 include, but is not limited to, user identification, numbering and addressing information, security information, or location information. HSS 763 may also provide call or session establishment procedures in both the PS and CS domains.

The VLR/MSC Server 760 can provide user location functionality. In an embodiment, when Mobile Station 701 enters a new network location, it begins a registration procedure. A MSC Server for that location transfers the location information to the VLR for the area. A VLR and MSC Server may be located in the same computing environment, as is shown by VLR/MSC Server 760, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 701 registration or procedures for handover of Mobile Station 701 to a different section of the Core Network 740. GMSC Server 761 may serve as a connection to alternate GMSC Servers for other mobile stations in larger networks.

Equipment Identity Register (EIR) 762 is a logical element which may store the International Mobile Equipment Identities (IMEI) for Mobile Station 701. In a typical embodiment, user equipment may be classified as either "white listed" or "black listed" depending on its status in the network. In one embodiment, if Mobile Station 701 is stolen and put to use by an unauthorized user, it may be registered as "black listed" in EIR 762, preventing its use on the network. Mobility Management Entity (MME) 764 is a control node which may track Mobile Station 701 or User Equipment 702 if the devices are idle. Additional functionality may include the ability of MME 764 to contact an idle Mobile Station 701 or User Equipment 702 if retransmission of a previous session is required.

Communication system 700 can be overlaid or operably coupled with system 600. In particular, system 700 can comprise a processing system including a processor that performs a method including receiving, by the processing system, data from a plurality of machine-to-machine (M2M) communication devices located in a premises. The method can also include aggregating the data to generate local monitored information, and receiving a message from a user communication device; the message comprises a request regarding an M2M communication device of the plurality of M2M communication devices. The method can also include analyzing the request according to the local monitored information. In accordance with determining that the request cannot be responded to based on the local monitored information, the method can further include transmitting a query message to the M2M communication device based on the analyzing and receiving a reply to the query message from the M2M communication device. The method can also include generating a response message based on the reply; the device receives the data and transmits the query message within the premises using millimeter-wave communications with the M2M communication device in a line-of-sight arrangement with respect to the device, WiFi communications, or a combination thereof.

It is further noted that various terms used in the subject disclosure can include features, methodologies, and/or fields that may be described in whole or in part by standards bodies such as Third Generation Partnership Project (3GPP). It is further noted that some or all embodiments of the subject disclosure may in whole or in part modify, supplement, or otherwise supersede final or proposed standards published and promulgated by 3GPP.

Figure 8:
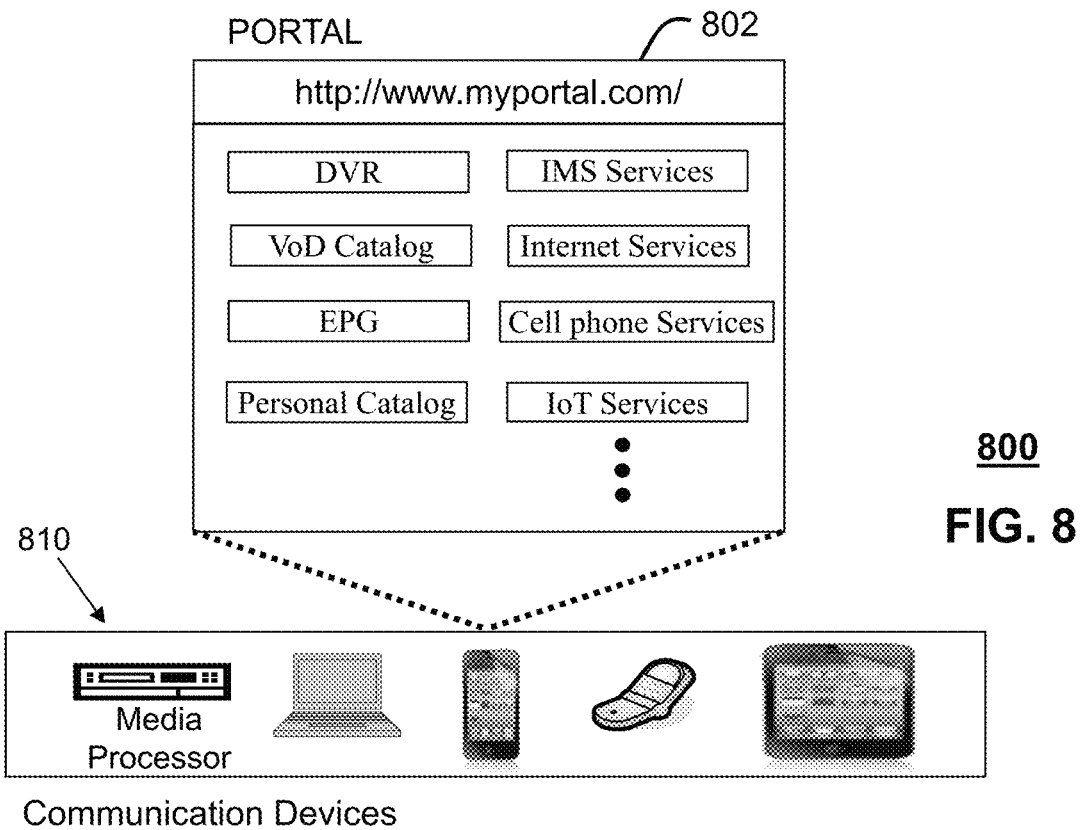
FIG. 8 depicts an illustrative embodiment of a web portal for interacting with the communication systems of FIGS. 6-7.

FIG. 8 depicts an illustrative embodiment of a web portal 802 of a communication system 800. Communication system 800 can be overlaid or operably coupled with the systems of FIGS. 6-7 as another representative embodiment of systems 600-700. The web portal 802 can be used for managing services of communication systems 600-700. A web page of the web portal 802 can be accessed by a Uniform Resource Locator (URL) with an Internet browser using an Internet-capable communication device such as those described in FIGS. 6-8. The web portal 802 can be configured, for example, to access a media processor and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor. The web portal 802 can also be used for provisioning various services on the communication devices 810, for example IMS services, Internet services, cellular phone services, IoT services, and so on.

In particular, web portal 802 can be used to access and/or configure IoT devices. In an embodiment, web portal 802 is used to perform inventory management of IoT devices.

The web portal 802 can further be utilized to manage and provision software applications and to adapt these applications as may be desired by subscribers and/or service providers of communication systems 600-700. For instance, users of the services provided by servers in systems 600-700 can log into their on-line accounts and provision those servers with information to enable communication with devices described in FIGS. 6-7, and so on. Service providers can log onto an administrator account to provision, monitor and/or maintain the systems 600-700 of FIGS. 6-7.

Figure 9:
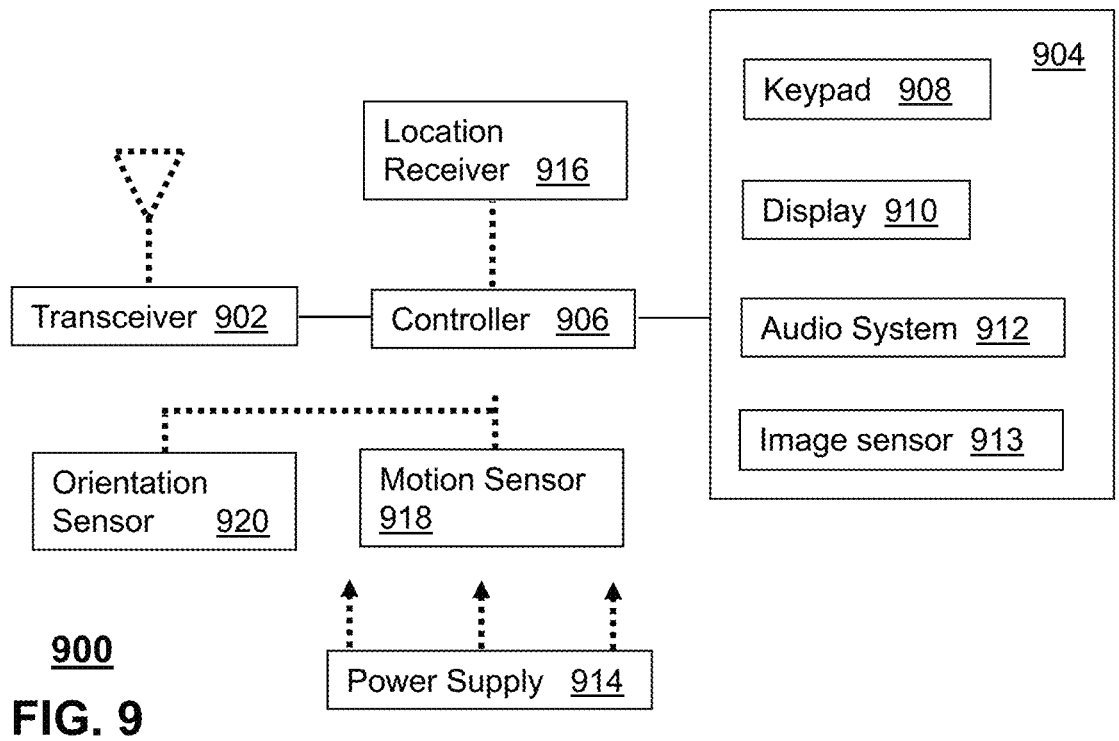
FIG. 9 depicts an illustrative embodiment of a communication device.

FIG. 9 depicts an illustrative embodiment of a communication device 900. Communication device 900 can serve in whole or in part as an illustrative embodiment of the devices depicted in FIGS. 1-4 and can be configured to perform portions of method 500 of FIG. 5.

Communication device 900 can comprise a wireline and/or wireless transceiver 902 (herein transceiver 902), a user interface (UI) 904, a power supply 914, a location receiver 916, a motion sensor 918, an orientation sensor 920, and a controller 906 for managing operations thereof. The transceiver 902 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 902 can also be adapted to support circuit-switched wireline access technologies (such as PSTN), packet-switched wireline access technologies (such as TCP/IP, VoIP, etc.), and combinations thereof.

The UI 904 can include a depressible or touch-sensitive keypad 908 with a navigation mechanism such as a roller ball, a joystick, a mouse, or a navigation disk for manipulating operations of the communication device 900. The keypad 908 can be an integral part of a housing assembly of the communication device 900 or an independent device operably coupled thereto by a tethered wireline interface (such as a USB cable) or a wireless interface supporting for example Bluetooth®. The keypad 908 can represent a numeric keypad commonly used by phones, and/or a QWERTY keypad with alphanumeric keys. The UI 904 can further include a display 910 such as monochrome or color LCD (Liquid Crystal Display), OLED (Organic Light Emitting Diode) or other suitable display technology for conveying images to an end user of the communication device 900. In an embodiment where the display 910 is touch-sensitive, a portion or all of the keypad 908 can be presented by way of the display 910 with navigation features.

The display 910 can use touch screen technology to also serve as a user interface for detecting user input. As a touch screen display, the communication device 900 can be adapted to present a user interface with graphical user interface (GUI) elements that can be selected by a user with a touch of a finger. The touch screen display 910 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 910 can be an integral part of the housing assembly of the communication device 900 or an independent device communicatively coupled thereto by a tethered wireline interface (such as a cable) or a wireless interface.

The UI 904 can also include an audio system 912 that utilizes audio technology for conveying low volume audio (such as audio heard in proximity of a human ear) and high volume audio (such as speakerphone for hands free operation). The audio system 912 can further include a microphone for receiving audible signals of an end user. The audio system 912 can also be used for voice recognition applications. The UI 904 can further include an image sensor 913 such as a charged coupled device (CCD) camera for capturing still or moving images.

The power supply 914 can utilize common power management technologies such as replaceable and rechargeable batteries, supply regulation technologies, and/or charging system technologies for supplying energy to the components of the communication device 900 to facilitate long-range or short-range portable applications. Alternatively, or in combination, the charging system can utilize external power sources such as DC power supplied over a physical interface such as a USB port or other suitable tethering technologies.

The location receiver 916 can utilize location technology such as a global positioning system (GPS) receiver capable of assisted GPS for identifying a location of the communication device 900 based on signals generated by a constellation of GPS satellites, which can be used for facilitating location services such as navigation. The motion sensor 918 can utilize motion sensing technology such as an accelerometer, a gyroscope, or other suitable motion sensing technology to detect motion of the communication device 900 in three-dimensional space. The orientation sensor 920 can utilize orientation sensing technology such as a magnetometer to detect the orientation of the communication device 900 (north, south, west, and east, as well as combined orientations in degrees, minutes, or other suitable orientation metrics).

The communication device 900 can use the transceiver 902 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 906 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 900.

Other components not shown in FIG. 9 can be used in one or more embodiments of the subject disclosure. For instance, the communication device 900 can include a reset button (not shown). The reset button can be used to reset the controller 906 of the communication device 900. In yet another embodiment, the communication device 900 can also include a factory default setting button positioned, for example, below a small hole in a housing assembly of the communication device 900 to force the communication device 900 to re-establish factory settings. In this embodiment, a user can use a protruding object such as a pen or paper clip tip to reach into the hole and depress the default setting button. The communication device 900 can also include a slot for adding or removing an identity module such as a Subscriber Identity Module (SIM) card. SIM cards can be used for identifying subscriber services, executing programs, storing subscriber data, and so forth.

The communication device 900 as described herein can operate with more or less of the circuit components shown in FIG. 9. These variant embodiments can be used in one or more embodiments of the subject disclosure.

The communication device 900 can be adapted to perform the functions of devices of FIGS. 6 and/or 7. It will be appreciated that the communication device 900 can also represent other devices that can operate in systems of FIGS. 1-4.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 10:
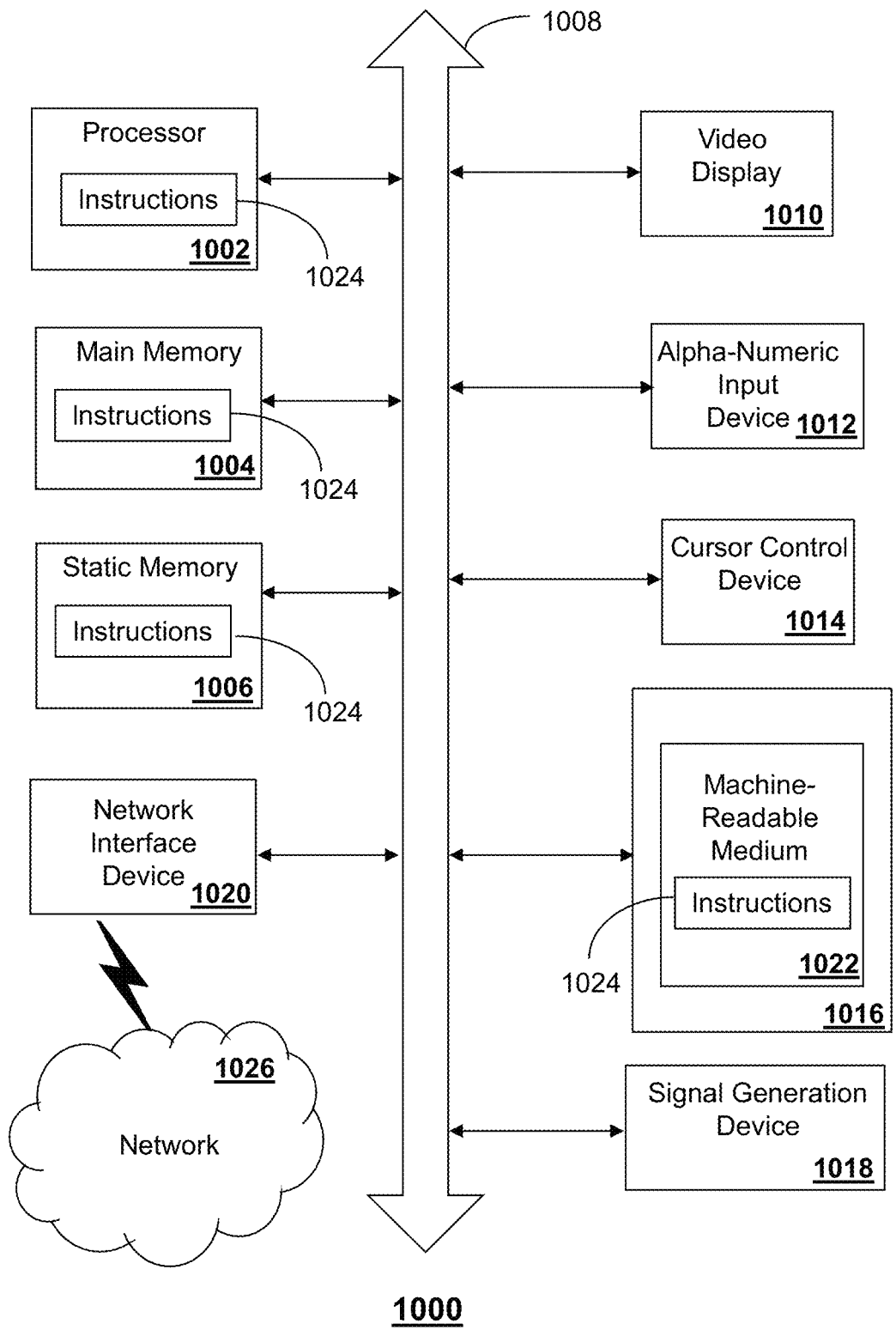
FIG. 10 is a diagrammatic representation of a machine in the form of a computer system within which a set of instructions, when executed, may cause the machine to perform any one or more of the methods described herein.

FIG. 10 depicts an exemplary diagrammatic representation of a machine in the form of a computer system 1000 within which a set of instructions, when executed, may cause the machine to perform any one or more of the methods described above. One or more instances of the machine can operate, for example, as the service gateway 120, the LADN 130, and other devices of FIGS. 1-4 In some embodiments, the machine may be connected (e.g., using a network 1026) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1000 may include a processor (or controller) 1002 (e.g., a central processing unit (CPU)), a graphics processing unit (GPU, or both), a main memory 1004 and a static memory 1006, which communicate with each other via a bus 1008. The computer system 1000 may further include a display unit 1010 (e.g., a liquid crystal display (LCD), a flat panel, or a solid state display). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020. In distributed environments, the embodiments described in the subject disclosure can be adapted to utilize multiple display units 1010 controlled by two or more computer systems 1000. In this configuration, presentations described by the subject disclosure may in part be shown in a first of the display units 1010, while the remaining portion is presented in a second of the display units 1010.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1022 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1000. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A local aggregator device comprising:
a processing system including a processor; and
a memory that stores executable instructions that, when executed by the processing system, facilitate performance of operations, the operations comprising:
aggregating, by the local aggregator device located at a premises and operating in a first network providing local network services within the premises, data from a plurality of machine-to-machine (M2M) communication devices to generate local monitored information;
receiving a message from a user communication device via a second network providing communication services outside of the premises, the user communication device separate from the processing system and from the plurality of M2M communication devices, the message comprising a user request regarding an M2M communication device of the plurality of M2M communication devices;
determining whether the user request can be responded to based on the local monitored information; and
in accordance with determining that the user request cannot be responded to based on the local monitored information, transmitting a query message to the M2M communication device based on an analysis of the user request according to the local monitored information.

2. The local aggregator device of claim 1, wherein the user request comprises an instruction to control the M2M communication device, and wherein the operations further comprise transmitting a control signal to control the M2M communication device according to the instruction.

3. The local aggregator device of claim 2, wherein the local aggregator device has an internet protocol address, and wherein the message is transmitted to the local aggregator device in accordance with a mapping of the internet protocol address to a telephone number provided at a user interface of the user communication device.

4. The local aggregator device of claim 1, wherein the local monitored information is stored in the memory of the local aggregator device, and wherein a response message is generated based on a reply to the query message received from the M2M communication device.

5. The local aggregator device of claim 1, wherein the message comprises a request to perform a reconfiguration of an M2M communication device.

6. The local aggregator device of claim 1, wherein the local aggregator device communicates with the M2M communication devices using wireless access in a frequency range 2.4 GHz 75 GHz.

7. The local aggregator device of claim 6, wherein the M2M communication devices are in a line-of-sight arrangement with respect to the local aggregator device.

8. The local aggregator device of claim 1, wherein the local aggregator device receives the data according to a pre-determined schedule and transmits the query message within the premises via the first network using millimeter-wave communications, WiFi communications, or a combination thereof.

9. The local aggregator device of claim 8, wherein the pre-determined schedule is defined according to user service programming of the local aggregator device.

10. The local aggregator device of claim 1, wherein the message is received from the user communication device via a service gateway of a plurality of service gateways having IP connections to the local aggregator device.

11. A method comprising:
aggregating, by a processing system including a processor of a local aggregator device located at a premises and operating in a first network providing local network services within the premises, data from a plurality of machine-to-machine (M2M) communication devices to generate local monitored information;
receiving, by the processing system, a message from a user communication device via a second network providing communication services outside of the premises, the user communication device separate from the processing system and from the plurality of M2M communication devices, the message comprising a user request regarding an M2M communication device of the plurality of M2M communication devices;
determining, by the processing system, whether the user request can be responded to based on the local monitored information; and
in accordance with determining that the user request cannot be responded to based on the local monitored information, sending, by the processing system, a query message to the M2M communication device based on an analysis of the user request according to the local monitored information.

12. The method of claim 11, wherein the user request further comprises an instruction to control the M2M communication device, and further comprising transmitting, by the processing system, a control signal to control the M2M communication device according to the instruction.

13. The method of claim 11, wherein the message further comprises a request to perform a reconfiguration of an M2M communication device.

14. The method of claim 11, wherein the local aggregator device receives the data according to a pre-determined schedule.

15. The method of claim 14, wherein the pre-determined schedule is defined according to user service programming of the local aggregator device.

16. A non-transitory, machine-readable storage medium, comprising executable instructions that, when executed by a processing system including a processor, facilitate performance of operations, the operations comprising:
combining, by a local aggregator device located at a premises and operating in a first network providing local network services within the premises, data from a plurality of machine-to-machine (M2M) communication devices to generate local monitored information;

receiving a message from a user communication device via a second network providing communication services outside of the premises, the user communication device separate from the processing system and from the plurality of M2M communication devices, the message comprising a user request regarding an M2M communication device of the plurality of M2M communication devices;

determining whether the user request can be responded to based on the local monitored information; and in accordance with determining that the user request cannot be responded to based on the local monitored information, providing a query message to the M2M communication device based on an analysis of the user request according to the local monitored information.

17. The non-transitory, machine-readable storage medium of claim 16, wherein the user request comprises an instruction to control the M2M communication device, and wherein the operations further comprise transmitting a control signal to control the M2M communication device according to the instruction.

18. The non-transitory, machine-readable storage medium of claim 16, wherein the message comprises a request to perform a reconfiguration of an M2M communication device.

19. The non-transitory, machine-readable storage medium of claim 16, wherein the data is received according to a pre-determined schedule.

20. The non-transitory, machine-readable storage medium of claim 19, wherein the pre-determined schedule is defined according to user service programming of the processing system.

* * * * *